United States Patent [19]
Vandenberg

[11] 4,371,190
[45] Feb. 1, 1983

[54] AXLE SUSPENSION SYSTEM
[75] Inventor: Ervin K. Vandenberg, Massillon, Ohio
[73] Assignee: Turner Quick-Lift Corporation, Canton, Ohio
[21] Appl. No.: 116,339
[22] Filed: Jan. 28, 1980
[51] Int. Cl.³ ............................................. B60G 11/26
[52] U.S. Cl. .................................... 280/705; 280/725
[58] Field of Search ............... 280/80 R, 111, 112 R, 280/676, 677, 678, 679, 681, 683, 684, 685, 688, 700, 701, 702, 705, 711, 713, 721, 722, 723, 724

[56] References Cited
U.S. PATENT DOCUMENTS

| 2,713,498 | 7/1955 | Brown | 280/683 |
| 3,014,735 | 12/1961 | Lich | 280/678 |
| 3,162,464 | 12/1964 | Woolslayer et al. | 280/677 |
| 3,171,668 | 3/1965 | Willetts | 280/684 |
| 3,921,999 | 11/1975 | Masser | 280/676 |
| 4,162,090 | 7/1979 | Schwartz | 280/688 |
| 4,166,640 | 9/1979 | Van Denberg | 280/711 |

Primary Examiner—David M. Mitchell
Assistant Examiner—Ross Weaver
Attorney, Agent, or Firm—Geoffrey R. Myers

[57] ABSTRACT

An axle-to-beam connecting member for a beam type axle suspension, the member comprising an axle housing capable of rigidly retaining an axle therein, an elastomerically bushed beam housing for retaining a beam therein and an elastomerically bushed pin connection for pivotally connecting the member to the beam, the pin connection being displaced in the longitudinal direction of the beam from the beam housings.

30 Claims, 9 Drawing Figures

AXLE SUSPENSION SYSTEM

This invention relates to axle suspension systems for wheeled vehicles. More particularly this invention relates to improved axle-to-beam connecting members for suspensions of the beam type.

Axle suspensions of the beam type, particularly of the rigid beam type which may employ air or mechanical springs in load bearing relation to the axle, have been known for many years in the truck and trailer industry. They may be of the single axle, tandem, or multiaxle type.

Generally speaking, these suspensions include an elongated, substantially rigid or at times flexible (e.g., spring) beam extending on each side of the vehicle. In most of these suspensions, there is employed a beam which is usually pivotally connected at one of its ends, or intermediate its ends, to the frame of the vehicle by a hanger bracket or other type of frame connecting member. At some other location on the beam there is then usually located one or more members which connect the axles to the beam (i.e., axle-to-beam connecting member for each axle).

In certain well known and quite widely used suspensions, an airbag is spaced from the hanger bracket along the beam. The airbag is positioned along the beam so as to form a cushion of air functionally located between the axle and the vehicle frame thereby to provide what is referred to as an "air suspension".

In some instances the beam is located in a posture such that the vehicle frame connecting member (e.g., a pivotally attached hanger bracket) is located at the end of the beam in the forward direction of vehicle travel and the airbag is at the end in the rearward direction. When such a posture is present, the suspension is usually referred to as a "trailing beam" or "trailing arm" suspension. In some instances, the beam may extend between two axles at either end and be connected intermediate its ends to the chassis frame. Such a suspension is sometimes referred to as a "walking beam" suspension.

In certain instances the airbags may be located at either or both of the ends of the beam while the axle-to-beam connecting member is located between the hanger bracket and the airbag. In other instances the airbag and axle-to-beam connecting member may both be located at the end of the beam. When the beam is located on top of the axle, the suspension is referred to as a "top mount" and when located under the axle it is said to be "underslung".

The subject invention contemplates within its scope all of the various modes or different types of the basic beam type suspensions. Indeed, it is a feature of the subject invention that it may be used in virtually any of the known types of beam suspensions to thereby improve the important characteristics of durability and safety.

Safety requires that the suspension be sufficiently rigid so as to provide for stability of the vehicle during operation. Durability requires, for example, that the suspension be capable of absorbing or transferring the various articulation forces incurred during operation without undue wear or damage to the parts.

In an attempt to simultaneously achieve an acceptable level of these two sometimes competing characteristics (i.e., safety and durability), the art has heretofore employed various elastomeric bushing techniques either at the vehicle frame connecting member such as the aforesaid hanger bracket, the axle-to-beam connecting, or both. Exemplary of such bushing techniques include the use of an elastomeric bushing element or pad between the axle and the axle seat and/or using a bushed pin at the beam-to-hanger bracket connection. Another technique is to use a plurality of bushed pins to connect the axle housing to the beam such as is shown in U.S. Pat. No. 3,332,701. Still another technique is to employ a large bushing pad between the beam and the beam housing which has connected thereto, on its upper wall, an axle housing in which the axle may be rigidly connected via U-bolts, welds, etc. In such a unit, the beam housing is prevented from sliding by protrusions extending from the beam. Still another, and quite successful technique, is to provide the unique elastomeric bushing arrangements as described in U.S. Pat. No. 4,166,640.

Each of these prior art techniques have their drawbacks. For example, in those prior art techniques employing pin bushings, other than the ones described in U.S. Pat. No. 4,166,640, the pins are often inadequate to take up or transfer the articulation forces experienced, and thus durability is not optimized. While the embodiments illustrated in U.S. Pat. No. 4,166,640 work quite well and add a high degree of durability and stability to the system, they are somewhat expensive and thus not economically justifiable in certain applications. In those units employing a bushing pad between the axle and the axle seat, not only may safety become something of a problem—it being recognized that a rigid axle connection is best—but durability is materially decreased.

In the units which rigidly connect the axle to the axle housing but employ a wrap-around elastomeric pad between the beam and the beam housing, torque forces incurred during operation, particularly those about the longitudinal axis of the axle, create uneven stress in and degradation of the pad. This present both a safety and a durability problem, as well as an economic one in that the pad must be replaced quite often. In addition, such units generally employ the axle securing U-bolts as the mechanism for securing the beam housing parts together. This in turn necessitates entrusting the final stage manufacture of the vehicle with the task of aligning and prestressing the pad correctly when he secures the axle to the vehicle and tightens the U-bolts. Such is less than desirable, of course, and it would be a significant improvement if a means were devised whereby the pad and beam housing could be secured in place to the beam without having to secure the axle to the system. Such a system would enable the suspension manufacturer to accurately align and prestress the pad for optimum durability under his quality control program.

It is apparent from the above that there exists a need in the art for an axle suspension system of the rigid beam type which is economical and which overcomes the above described problems currently existing, thereby to provide a system of improved safety, stability and durability. It is a purpose of this invention to fulfill this and other needs in the art more apparent to the skilled artisan once given the following disclosure:

Generally speaking this invention fulfills the above needs in the art by providing an axle-to-beam connecting member for a beam type axle suspension, the member comprising an axle housing capable of rigidly retaining an axle therein, an elastomerically bushed beam housing for retaining a beam therein and an elastomerically bushed pin connection for pivotally connecting the member to the beam, the pin connection being displaced in the longitudinal direction of the beam from the beam housing.

These axle-to-beam connecting members can be appropriately used to thus further fulfill the above needs in the art by providing, in known or newly developed axle suspension systems of the rigid or nonrigid beam type including a longitudinal beam and further including an airbag and an axle-to-beam connecting member each located along the beam, the improvement which comprises as said axle-to-beam connecting member, a member which includes an axle housing capable of rigidly retaining an axle thereon, a beam housing having located therein a portion of said beam, an elastomeric element located between the beam housing and the portion of said beam located therein, a pin means pivotally connecting the beam to the axle-to-beam connecting member, said pin means extending transverse to the longitudinal direction of said member and said beam, and an elastomeric bushing located between said pin and said beam, said pin being located at a longitudinally spaced distance from said beam housing such that torque forces about the longitudinal center line of an axle when located in said axle housing will effectively cause rotation of said beam housing about the center line of said pin.

This invention, while applicable to a wide variety of beam type suspensions as described above, is particularly useful in suspensions of the rigid beam type. Such suspensions may be of many known sub-types, such as the trailing arm or walking beam type. This invention, for example, fulfills a particularly unique need in the trailing arm (or its reverse mode) type of suspension because of the current widespread use of these suspensions. Thus in many of the embodiments contemplated by this invention, the system is of the rigid beam type and usually further includes a hanger bracket or other vehicle frame connecting member pivotally connected at one end of the beam and wherein both the airbag and axle-to-beam connecting member are longitudinally spaced from such a connecting member along the beam. Such suspensions may include the airbags being located at the other end of the beam and the member being located either at this end or intermediate the hanger and airbag.

In certain embodiments, the unit is a trailing arm suspension and the pin is located in a flange extending in a continuum rearwardly of the beam housing. In any event, and regardless of how achieved, or in what type of suspension it is employed, the spacing of the pivot pin longitudinally from the beam housing serves the unique and important function of spreading the torque forces coming from the axle more uniformly across the elastomeric wrap or pad (i.e., element) located between the beam and beam housing. This, in turn, increases the durability and life of the elastomeric wrap, increases safety and economy, and in some embodiments allows for a wrap of less length to be used.

In certain other embodiments the beam housing is formed of two parts which are secured together by means not associated with the means that secure the axle to the axle housing. This enables the elastomeric element, provided in either one or two parts, to be accurately secured, and the required prestressed pressure, between the beam and the beam housing to be set by the manufacturer of the suspension before the axle must be secured to its housing.

This invention will now be described with respect to certain embodiments thereof as illustrated in the accompanying drawings, wherein:

Figure 1:
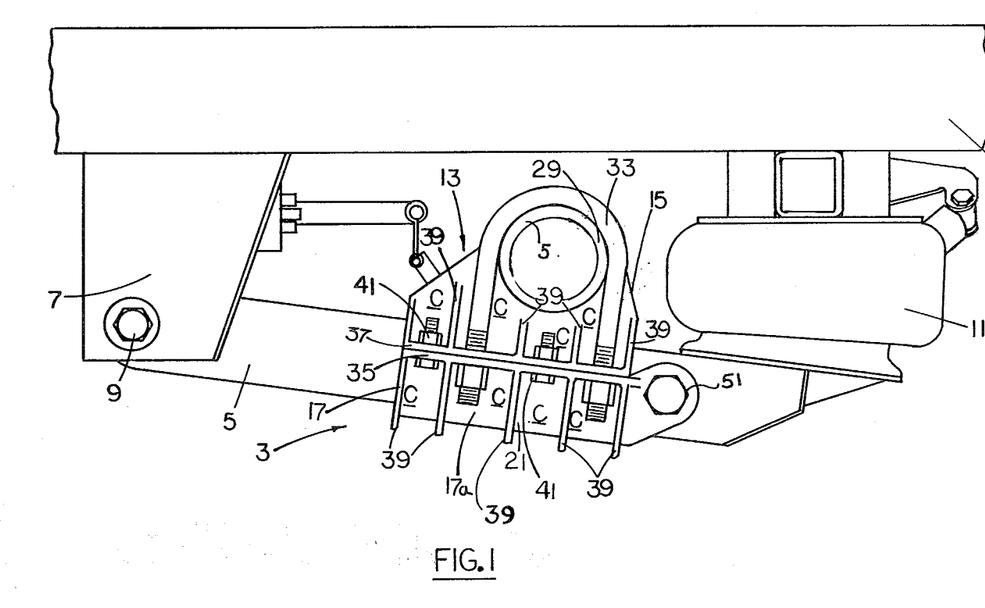
FIG. 1 is a side plan view of an embodiment of this invention.
Figure 2:
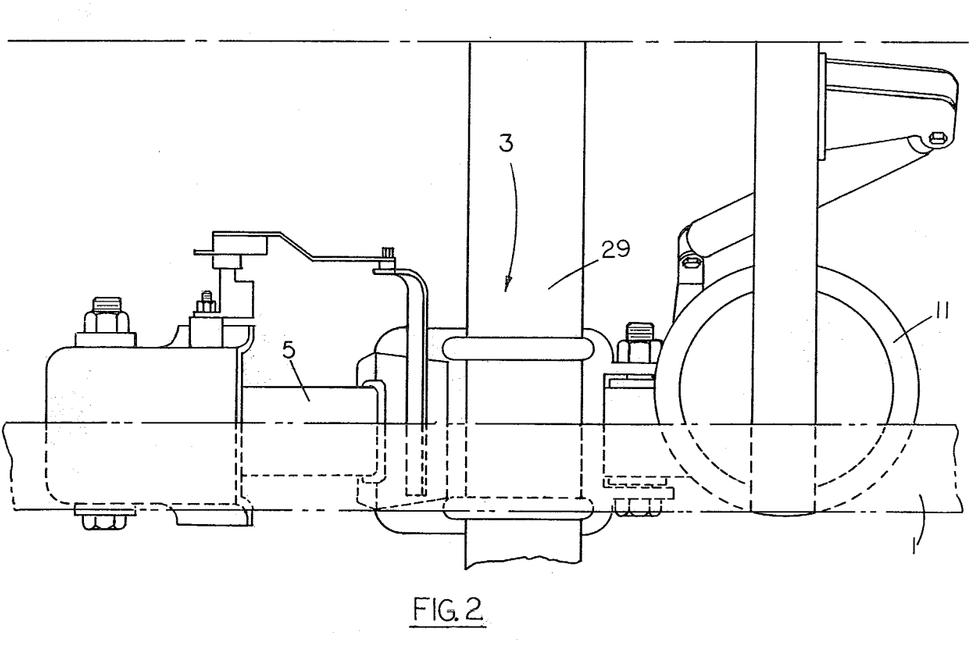
FIG. 2 is a top plan view of the embodiment of FIG. 1 showing the right hand half of the suspension only, the left hand half being a duplicate thereof.

With reference to FIGS. 1-2, there is illustrated a longitudinal frame member 1 of a truck or trailer (not shown) having connected thereto an axle suspension system 3 according to this invention. The suspension illustrated is a rigid beam suspension of the trailing arm, underslung type. It is understood that the system could also be a non-trailing arm suspension by facing it the other way. In addition, by rotating the axle connection as hereinafter described, 180°, the suspension could be made into a top mount type. Indeed, it is to be understood that the use of a rigid beam, underslung trailing arm type suspension is for illustrative purposes and to highlight a use of particular interest and uniqueness, rather than to be considered as a limit on the scope of the invention.

Suspension 3 includes certain conventional parts of a known rigid beam type suspension including a rigid beam 5 connected at one end to hanger bracket 7 by bushed pivot pin connection 9 and connected at the other end to airbag means 11. Hanger bracket 7 in turn connects the beam to frame member 1 of the vehicle. FIG. 2 illustrates the right hand half of the vehicle. The complete suspension, of course, includes a duplicate structure for the left hand frame member 1 (not shown).

Figure 3:
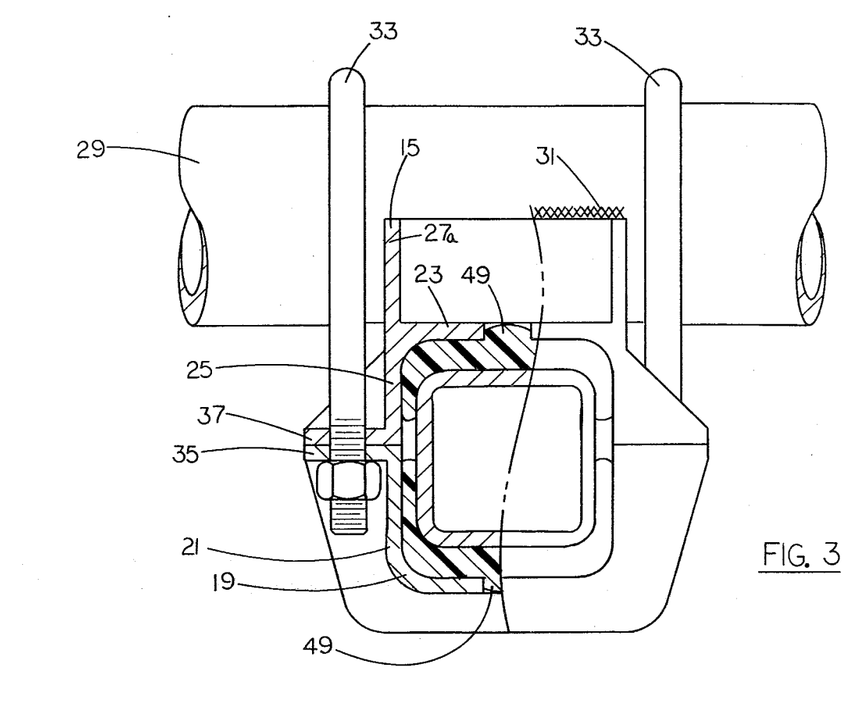
FIG. 3 is a partial rear, partially sectionalized view of the embodiment of FIG. 1.
Figure 4:
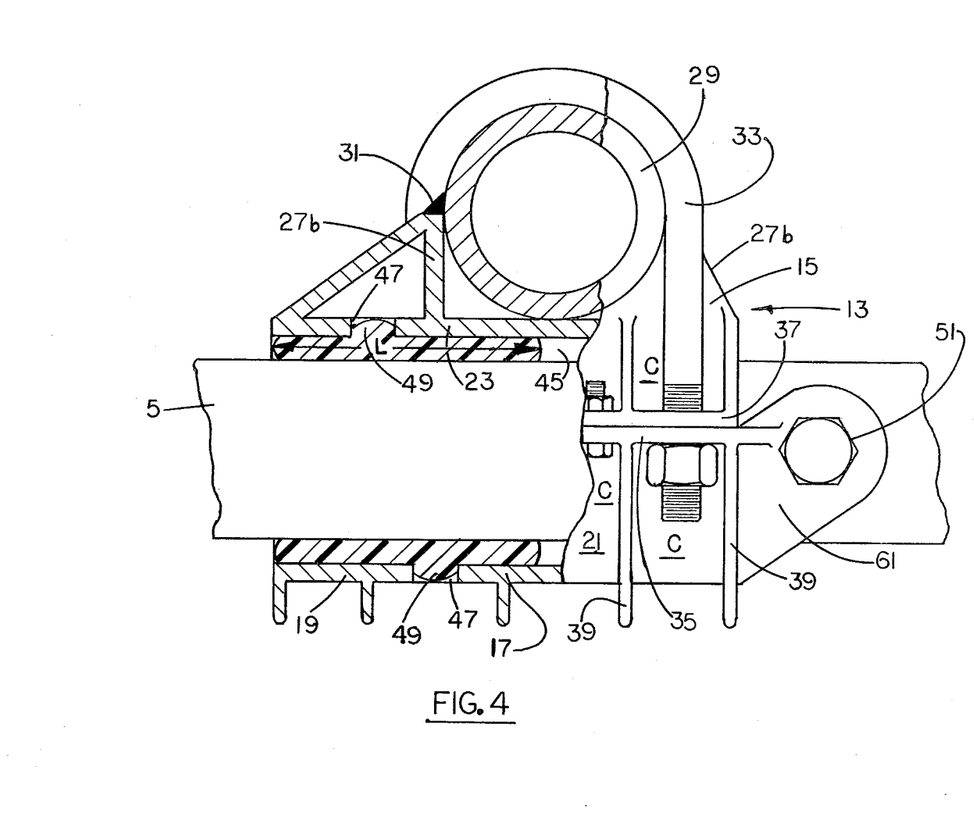
FIG. 4 is a partial side, partially sectionalized view of the embodiment of FIG. 1.

Located intermediate the ends of beam 5 is an axle-to-beam connecting member 13. As best illustrated in FIGS. 3-4, member 13 includes an axle housing 15 and a beam housing 17. Beam housing 17 is formed of two parts, a lower part 17a and an upper part 17b. Lower part 17a is formed of a bottom wall 19 and side walls 21 which wrap under and around beam 5. In like manner, upper part 17b has a top wall 23 and side walls 25 which wrap over and around beam 5. Axle housing 15 is comprised of saddle plates 27a and 27b on which axle 29 resides. Axle 29 is rigidly secured to housing 15 by welds 31 at plates 27b and by U-bolts 33.

The side walls 21 of lower part 17a are provided with laterally extending flanges 35. In like manner side walls 25 of upper part 17b are provided with laterally extending flanges 37, each of which abutts its respective complimentary flange 35. Each flange is reinforced by plate members 39, thereby to form four discrete members "C" above and below flanges 35 and 37. In each of these chambers there is provided an orifice for receiving a bolt.

With reference to FIG. 1, and starting from the left most chamber, the first and third orifices receive bolt means 41 while the second and fourth orifices receive the ends of U-bolts 33. Since bolt means 41 are distinct from U-bolts 33, member 13 may be secured in place at the suspension manufacturing sight independently of axle mounting, yet is easily disassembled for pad replacement if necessary. While bolts 41 are adequate to secure upper part 17b to lower part 17a, U-bolts 33 when in place act not only as a safety backup to welds 31 but to bolts 41 as well. Because flanges 35 and 37 are located at the abutting intersection of upper part 17b and lower part 17a, the bolts do not extend below bottom wall 17a, thereby assuring designed-in road clearance for the system regardless of how tightly the U-bolts are secured.

Located between beam 5 and member 13 is an elastomeric element (i.e., pad or bushing) 43. FIGS. 3-4 illustrate in scale the relative sizes of the parts used therein. As can be seen, element 43, formed of a lower part 43a and an upper part 43b, is a relatively thick elastomeric pad of conventional bushing material and denier, and wraps substantially but not totally around beam 5. There is no real reason why pad 43 could not extend fully around beam 5, but such is believed to be a waste of material or could result in a pinching of the polymer which could result in a loose axle connection, the criteria being that pad 43 must extend upwardly along side walls 21 and downwardly along side walls 25 a sufficient distance so that during operation beam 5 does not make direct contact with any part of member 13 including walls 19, 21, 23, and 25.

In regard to fulfilling this no-contact criterion, and with specific reference to FIG. 4, element 43 must also be of a sufficient length "L" to prevent such contact from taking place. As will be described more fully hereinafter, it is a unique feature of this invention that the length "L" of pad 43 may be significantly less than the length of cavity 45 formed between member 13 and beam 5.

To properly align pad 43 in cavity 45 and prevent slippage or movement during use, bottom wall 19 and top wall 23 are each provided with an orifice 47, either as a simple drilled hole or as an elongated groove. The orifice 47 in top wall 23 is off-set from that in bottom wall 19 in the vertical plane which provides, in operation, better assurance against slippage. Pad 43 is then provided with nobs 49 which align and snap or press fit into their respective orifices 47 for tight retention of pad 43 within cavity 45. Not only does this structure provide non-slippage characteristics, but it serves as an easy alignment technique which facilitates pad replacement, particularly at a location other than the suspension manufacturer's plant.

The reason why pad 43 may be of lesser length than cavity 45, and thus constitutes a unique feature of this invention, is the provision of pivot pin connection 51. Pivot pin connection 51 comprises an elastomerically bushed pin 53 of conventional design (e.g., Robertson type) which may also be of the same size and type employed at hanger pin 9. Such a pin 53 is illustrated best in FIG. 5, which shows to scale the relative sizes of the parts. As shown, pin 53 comprises a metal shaft and head bolt arrangement 53a surrounded by two metal layers 53b and 53c, which in turn is surrounded by bushing pad 55 of conventional size and denier which will vary according to known criteria—depending on the size of the suspension, load to be carried, etc. Bushing pad 55 is then encased in outer metal casing 57 which in turn is welded to beam 5 by welds 59.

Integrally associated with and as a part of member 13, are extension flanges 61 which form a continuum with lower side walls 21. Pin 53 extends through flanges 61 located on either side of beam 5 and retained at a spaced distance therefrom by welds 59 via casing construction 57 and 53. When nut 63 is tightened, thereby securing pin 53 in pivotal fashion through flanges 61 and beam 5, there is formed a bushed pivot connection off-set from the vertical plan of beam housing 17 which is capable of translating or "taking-up" the torque forces created about the longitudinal axis of axle 29 during operation of the vehicle and spreading them in a more uniform fashion across length "L" of elastomeric pad 43, thereby increasing its life and the safety of vehicle operation. The amount of spread will, of course, depend upon the amount of off-set and thus the length of flange 61. FIG. 4 illustrates, to approximate scale, the relative dimensions and sizes of an acceptable embodiment of this invention which has been found in practice to provide excellent durability and safety, and to fulfill the non-contact criterion as established above. Flange 61 and pin connection 51 are shown in this embodiment as being located on the rearward end of member 13. It is understood that in certain embodiments contemplated by this invention, flange 61 and pin connection 51 may be located on the other end (e.g., forward end or hanger bracket end) of member 13.

Figure 6:
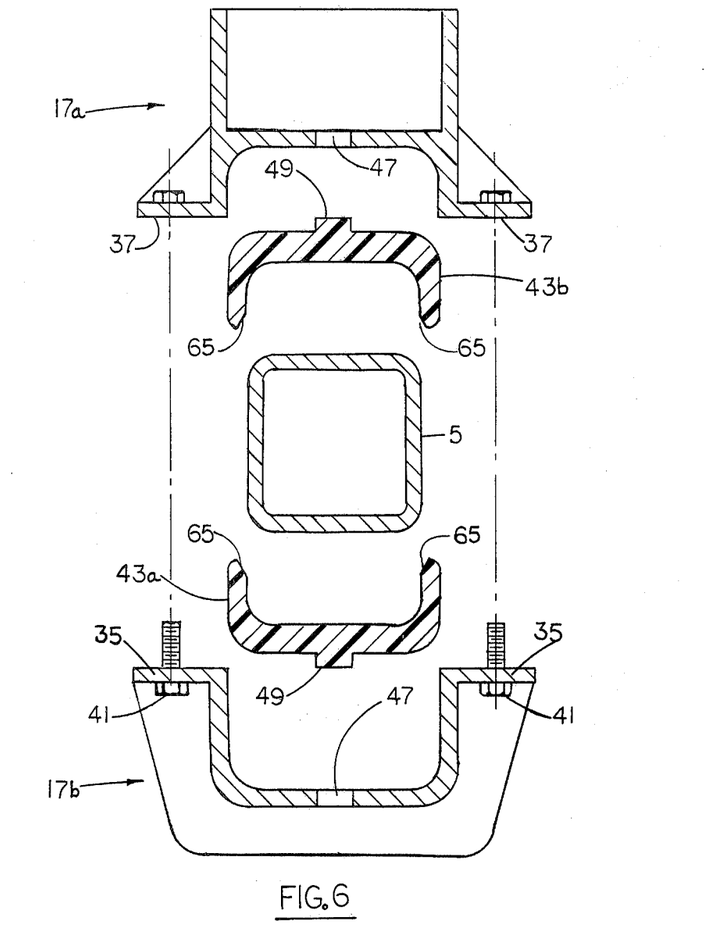
FIG. 6 is a rear plan, partially sectionalized and exploded view of the elastomeric element wrap of FIG. 1.

As stated above, the illustrated embodiment provides the unique feature of being able to secure pad 43 in place during suspension manufacturing without having to secure, simultaneously, the axle to the suspension. This is best illustrated in FIG. 6. As can be seen pad 43 is formed of upper part 43b and lower part 43a which are complementary in shape to the inner surfaces of the walls of beam housing 17 and to the outer surfaces of beam 5. Thus, without the need to secure axle 29 by U-bolts 33 to the suspension, member 13 may be press fit over beam 5 and pad 43 in one simple operation, and bolts 41 tightened to the desired degree by the suspension manufacturer who can also precisely locate pin connection 51 in beam 5 thereby to optimize quality control, durability and safety. In this respect, the ends 65 of pads 43a and 43b may be bevelled so as to simplify the press fitting operation.

Figure 7:
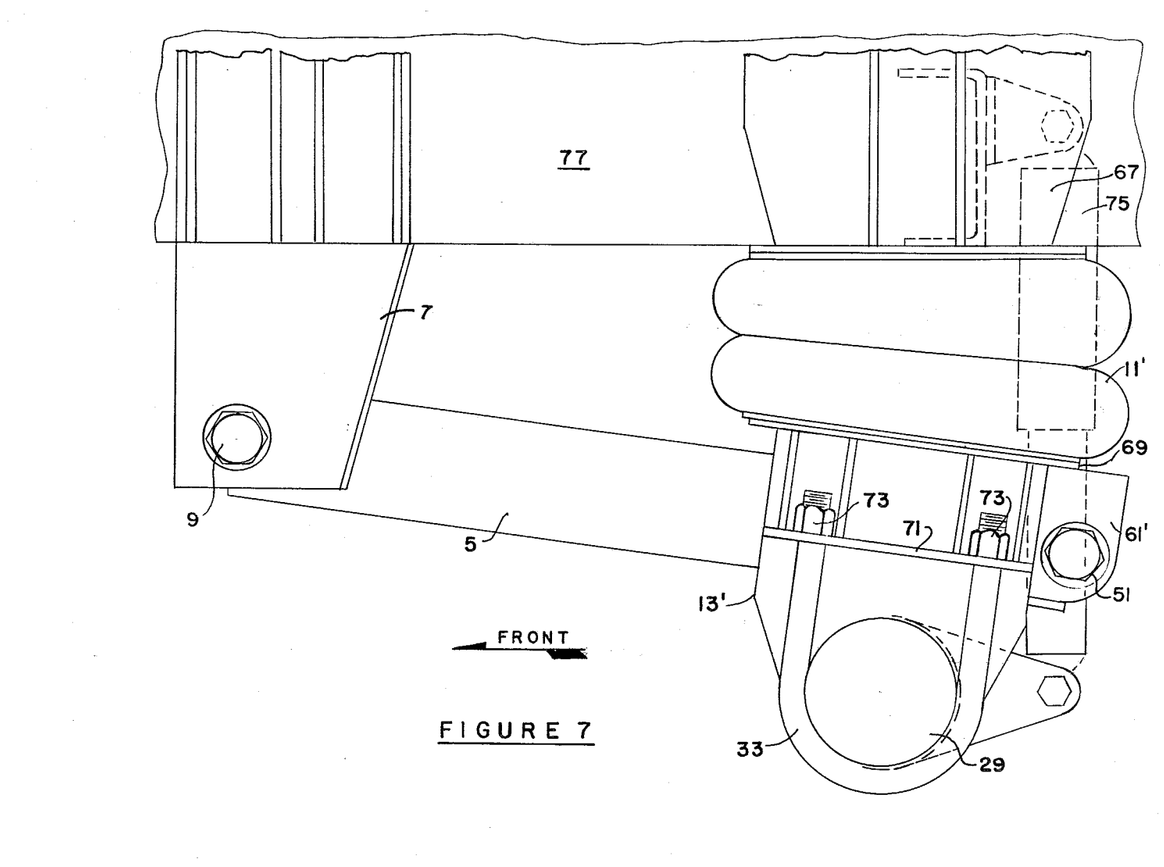
FIG. 7 is a side plan view of another embodiment of this invention.
Figure 8:
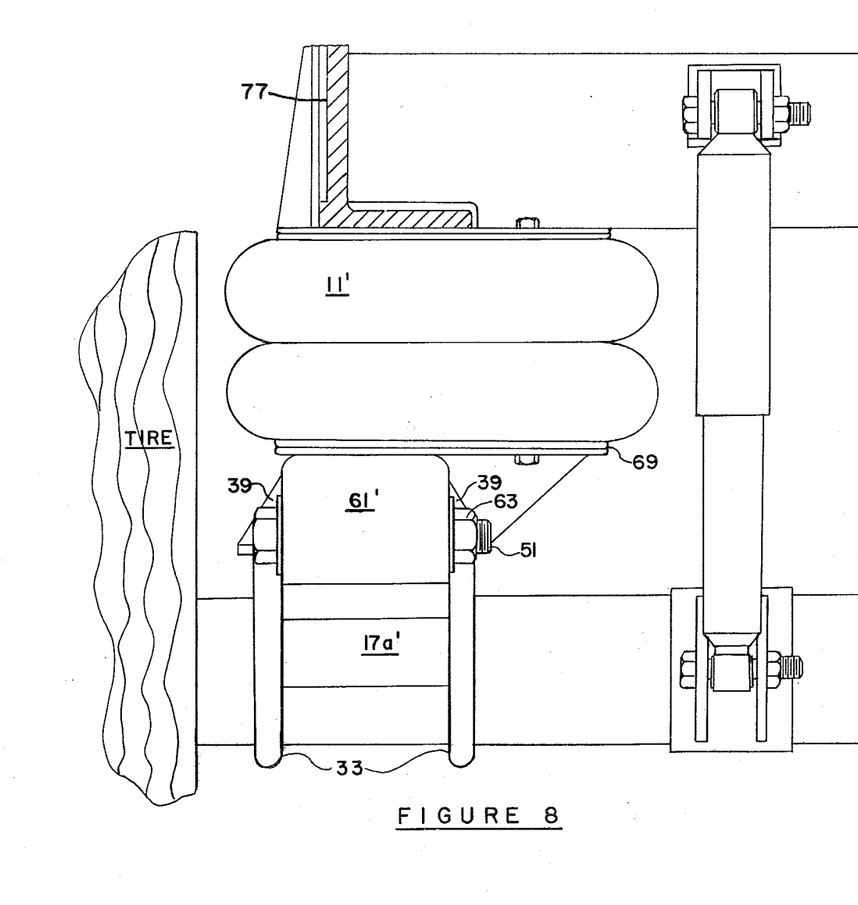
FIG. 8 is a rear plan view of the embodiment of FIG. 7.
Figure 9:
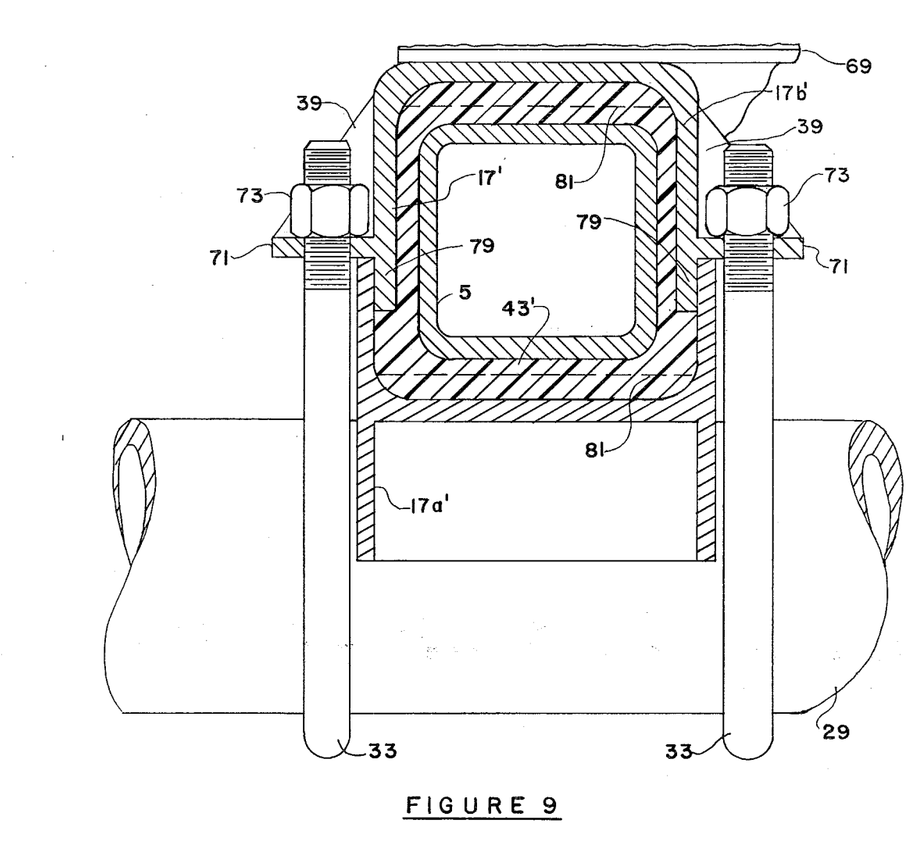
FIG. 9 is a partial rear, partially sectionalized view of the embodiment of FIG. 8.

FIGS. 7-9 illustrate another embodiment of this invention. The suspension shown is a trailing arm suspension of the top mount type, in which both the axle connection and the airbag system is located at the end of the rigid beam opposite that to which the hanger bracket is pivotally connected. The same numerals are used in FIGS. 7-9 as are used in FIGS. 1-6 to connote similar parts in either function or structure.

Figure 5:
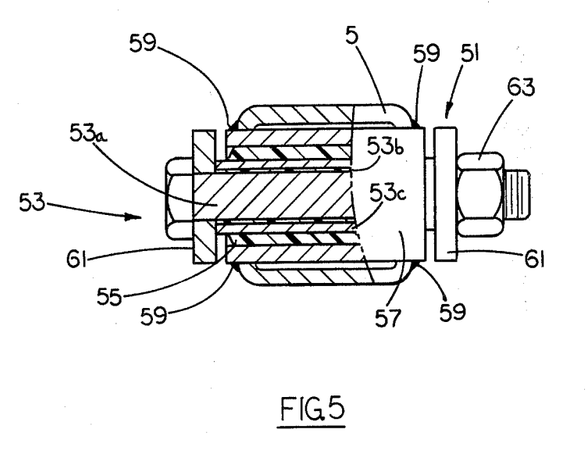
FIG. 5 is a rear plan, partially sectionalized view of the pivotal pin connection of FIG. 1.

With reference initially to FIG. 7, there is illustrated a rigid beam 5 connected at one end (in this case the forward end of travel) to hanger bracket 7 by pivotal hanger pin 9. At the end opposite pivotal hanger pin 9 is located double convoluted airbags 11' positioned between frame bracket 67 and plate members 69. Plate members 69 are in turn connected to the upper surface of axle-to-beam connection member 13'. Flange 61' extends rearwardly from member 13' and has located therein and extending through the end of beam 5, pivot pin connection 51. Pivot pins 9 and 51 in this embodiment may be the same ones as employed in the embodiment shown in FIGS. 1–6. In this respect therein, pivot pin connection 51 will include pivot pin 53 as illustrated in FIG. 5. As further described hereinabove, flange 61' and pivot pin connection 51 may in certain embodiments reside on the hanger bracket side or forward side of member 13' rather than extend rearwardly therefrom.

Member 13' has connected thereto a conventional axle 29 via U-bolts 33 which are connected to a single flange member 71 by tightening nuts 73. Completing the unit is conventional shock absorber 75.

The system as best illustrated perhaps in FIG. 8 is easily connected to the frame member of a truck or in this instance a trailer 77 by any conventional technique.

With specific reference now to FIG. 9, there is illustrated in partial sectional view, member 13' and its various components. As can be seen, member 13' generally comprises the same structure as member 13 rotated 180°—thereby to allow the top mounting of beam 5 above axle 29. There are, however, a few important differences between this axle-to-beam connection and that shown with respect to FIGS. 1–6. Firstly, it will be noted that while beam housing 17' is generally split into an upper beam housing part 17b' and a lower beam housing part 17a', the two parts are not joined in the same way as that shown with respect to the embodiment of FIGS. 1–6. In addition, elastomeric pad 43' is a preformed single piece constituting a full and complete wrap around as opposed to the non-continuous, two-piece construction of FIGS. 1–6.

Upper beam housing 17b' has on its upper surface, plates 69 on which air bellows 11' reside. Extending from both the inboard and the outboard sides of this generally U-shaped member 17b' are single flanges 71 which as hereinabove described serve to connect U-bolts 29 to the system. In this embodiment, then, the advantages of being able to connect the system together prior to installation of the axle is not achieved. It is understood, of course, that this embodiment could use the double flange system as set forth, for example, with respect to FIG. 6 if so desired. In this respect, it is to be pointed out, however, that the major problem with respect to field installation as opposed to manufacturing installation—prestressing—is largely overcome by the unique way in which the upper beam housing 17b' fits into lower beam housing 17a'. As illustrated, lower beam housing 17a' is slightly wider than the outside width of lower extensions 79 extending below flanges 71 on the sidewall of beam housing 17b'. This enables the upper surface of the sides of lower beam housing 17a' to abut against the lower surface of flange 71. This in turn prevents nuts 81 from being overly tightened, thereby to overly stress pad 43'.

As further illustrated in FIG. 9, pad 43' wraps entirely around beam 5. Its dimensions both in thickness and length may be the same as illustrated, for example, in FIGS. 3, 4 and 6. In this way, and when combined with the structures of pivot pin connection 51 and extension flange 61', there is provided a mechanism which acts similarly in regard to flange 61' and pivot pin connection 51 hereinabove described. That is to say, when pin 53 is used as the pin in pivot connection 51, it extends through flanges 61 located on either side of beam 5 as shown in FIG. 8. When nut 63 is tightened, thereby securing pin 53 in pivotal fashion through flanges 61' and beam 5, there is formed a bushed pivot pin offset from the vertical plane of beam housing 17' which is capable of translating or "taking up" the torque forces created along the longitudinal axis of axle 29 during operation of the vehicle and spreading them in a more uniform fashion across length "L" of the elastomeric pad 43', thereby strengthening its life and the safety of vehicle operation. As described above with respect to FIG. 4, the length of pad 43' and the amount of offset of flange 61' (thus determining the amount of offset and location of pivot pin connection 51) will be designed for the particular end use to which the unit is to be put. FIG. 7 illustrates, to approximate scale, the relative dimensions and sizes of an acceptable embodiment. As illustrated best in FIG. 9, retaining lugs 81 are provided at either end of the beam, immediately adjacent each end of elastomeric pad 43' to prevent slippage of the pad during use. In the alternative, such retaining lugs may be omitted and the techniques described with respect to FIGS. 1–6 with regard to knobs 49 and retaining orifices 47 may be employed.

Once given the above disclosure, many other features, modifications, and improvements will become apparent to the skilled artisan. Such other features, modifications and improvements are, therefore, considered to be a part of this invention, the scope of which is to be determined by the following claims:

I claim:

1. In an axle suspension system of the beam type including a longitudinal beam and further including an airbag and an axle-to-beam connecting member, each located along the beam, the improvement comprising as said axle-to-beam connecting member, a member which includes an axle housing capable of rigidly retaining an axle thereon, a beam housing having located therein a portion of said beam, an elastomeric element located between the beam housing and the portion of said beam located therein, a pin means for pivotally connecting the beam to the axle-to-beam connecting member, said pin means extending transverse to the longitudinal direction of said beam and being located between said member and said beam, and an elastomeric bushing located between said pin and said beam, said pin being located at a longitudinally spaced distance from said beam housing, such that torque forces about the longitudinal center line of an axle when located in said axle housing will effectively cause rotation of said beam housing about the center line of said pin.

2. An axle suspension system according to claim 1 wherein said beam housing substantially fully surrounds the portion of the beam located therewithin.

3. An axle suspension system according to claim 2 wherein said beam is a rigid beam and which further includes a vehicle frame connecting member attached to one end of the beam and wherein said airbag and axle-to-beam connecting member are each longitudinally spaced from the vehicle frame connecting member along the beam.

4. An axle suspension system according to claim 3 wherein said vehicle frame connecting member comprises a hanger bracket pivotally connected to said one end of the beam.

5. An axle suspension system according to claim 1 wherein said beam is pivotally connected at one end to a vehicle frame connecting member, said airbag is located at the other end of said beam, and said axle-to-beam connecting member is located intermediate the ends of the beam.

6. An axle suspension system according to claim 1 wherein said beam is pivotally connected at one end to a vehicle frame connecting member, and said airbag and axle-to-beam connecting member are located at the other end of the beam, said airbag and axle-to-beam connecting member being connected to each other.

7. An axle suspension system according to claim 1 wherein said beam housing is comprised of two parts releasably secured together by means which do not simultaneously secure an axle to said axle housing.

8. An axle suspension system according to claim 7 wherein said elastomeric element is comprised of two parts, each part being compatible with a respective part of said beam housing, and being of a sufficient size such that when said element is located between the beam and the beam housing, there is no direct contact, in operation, between said beam and said beam housing.

9. An axle suspension system according to claim 8 which includes means for securing an axle to said axle housing, said axle securing means being separate from said means for securing the two parts of said beam housing together.

10. An axle suspension system according to claim 9 wherein the first of said two parts of said beam housing comprises the upper part and includes a top wall and side walls and the second of said two parts of said beam housing comprises the lower part, and includes a bottom wall and side walls, the top wall of said upper part being connected to the axle housing and the side walls each having extending therefrom a lateral flange provided with an orifice therein, the bottom wall of said lower part extending under the beam and the side walls each having extending therefrom a lateral flange provided with an orifice, said lateral flange being abuttable with a respective lateral flange on a side wall of said upper part such that the orifices provided therein are aligned for receiving a bolt means thereby securing the upper part to the lower part and the elastomeric element between the beam and the beam housing having a finite gap between opposing faces of the two parts when said lateral flanges are in abuttable orifice aligning relationship.

11. An axle suspension system according to claim 10 wherein said flanges include additional aligned orifices for securing a U-bolt thereto, said U-bolt comprises a means for securing an axle to said axle housing.

12. An axle suspension system according to claim 11 wherein said pin means is located between the beam housing and said airbag means.

13. An axle suspension system according to claim 11 wherein there extends longitudinally from a side wall of said beam housing on either side of said beam an extension of said walls integrally connected thereto, and said pin means extends through said extensions and said beam.

14. An axle suspension system according to claim 13 wherein said pin means extends in a direction parallel to the direction of the longitudinal axis of an axle when present in said housing.

15. An axle suspension system according to claim 1 wherein said axle-to-beam connecting member is at one end of said beam and said pin means is connected to the rearwardmost edge of said beam.

16. An axle suspension system according to claim 15 wherein said airbag is connected to said axle-to-beam connecting member.

17. An axle suspension system according to claim 1 wherein said axle-to-beam connecting member is comprised of two parts, an uppermost part and a lowermost part, each of said two parts having side walls and a wall joining said side walls thereby to substantially completely surround the portion of the beam located therein, one of said parts being the first part and having a lateral flange extending from each of its side walls from a location intermediate the top and bottom edges of said side walls, the second of said parts being of a sufficient width such that the first parts' side walls extend into said second part and the side walls of said second part abut the lateral flanges on said side walls of the first part, and wherein said elastomeric element extends substantially completely around said beam between said beam and said two parts, said flanges being located such that when abutted by said side walls, said elastomeric element is stressed to a proper amount.

18. An axle suspension system according to claim 17 which further includes U-bolt means attached to said flanges for securing an axle to said axle housing and for retaining said side walls in abutting engagement with said flanges.

19. In a wheeled vehicle comprising a frame member and an axle suspension system attached to said frame member, the improvement comprising as said axle suspension system, the axle suspension system of claim 1.

20. A wheeled vehicle according to claim 19 wherein said pin is located at a longitudinally spaced distance rearward of said beam housing.

21. A wheeled vehicle comprising a frame member and an axle suspension system attached to said frame member such that the airbag is rearward of said hanger bracket, the improvement comprising as said axle suspension system, the axle suspension system of claim 14.

22. A wheeled vehicle according to claim 21 which further incluees an axle rigidly connected to said axle housing.

23. In a wheeled vehicle comprising a frame member and an axle suspension system attached to said frame member, the improvement comprising as said axle suspension system, the system of claim 1 wherein the longitudinal span along the beam of the beam housing is significantly greater than the longitudinal span of the elastomeric element located between the beam and beam housing, and the size of said elastomeric element is sufficient to prevent direct contact of said beam with said beam housing during operation of said vehicle.

24. In a wheeled vehicle comprising a frame member and an axle suspension system attached to said frame member, the improvement comprising as said axle suspension system, the system of claim 17 wherein the side walls of the second part abut the flanges of the first part at a predetermined location thereby to prevent overstressing of said elastomeric element despite the force applied by the U-bolts on the two parts.

25. An axle-to-beam connecting member for a beam type axle suspension, the member comprising an axle housing capable of rigidly retaining an axle therein, an elastomerically bushed beam housing for retaining a beam therein and an elastomerically bushed pin connection for pivotally connecting the member to the beam, the pin connection being displaced in the longitudinal direction of the beam from the beam housing.

26. A member according to claim 25 wherein said beam housing is comprised of two parts releasably secured together by means which do not simultaneously secure an axle to said axle housing.

27. A member according to claim 26 wherein said elastomeric element is comprised of two parts, each part being compatible with a respective part of said beam housing, and being of a sufficient size such that when said element is located between the beam and the beam housing, there is no direct contact, in operation, between said beam and said beam housing.

28. A member according to claim 27 which includes means for securing an axle to said axle housing, said axle securing means being separate from said means for securing the two parts of said beam housing together.

29. A member according to claim 28 wherein the first of said two parts of said beam housing comprises the upper part and includes a top wall and side walls and the second of said two parts of said beam housing comprises the lower part, and includes a bottom wall and side walls, the top wall of said upper part being connected to the axle housing and the side walls each having extending therefrom a lateral flange provided with an orifice therein, the bottom wall of said lower part extending under the beam and the side walls each having extending therefrom a lateral flange provided with an orifice, said lateral flange being abuttable with a respective lateral flange on a side wall of said upper part such that the orifices provided therein are aligned for receiving a bolt means thereby securing the upper part to the lower part and the elastomeric element between the beam and the beam housing having a finite gap between opposing faces of the two parts when said lateral flanges are in abuttable orifice aligning relationship.

30. A member according to claim 25 wherein said axle-to-beam connecting member is comprised of two parts, an uppermost part and a lowermost part, each of said two parts having side walls and a wall joining said side walls thereby to substantially completely surround the portion of the beam located therein, one of said parts being the first part and having a lateral flange extending from each of its side walls from a location intermediate the top and bottom edges of said side walls, the second of said parts being of a sufficient width such that the first parts' side walls extend into said second part and the side walls of said second part abut the lateral flanges on said side walls of the first part, and wherein said elastomeric elements extend substantially completely around said beam between said beam and said two parts, said flanges being located such that when abutted by said side walls, said elastomeric element is stressed to a proper amount.

* * * * *